(12) United States Patent
Täubert et al.

(10) Patent No.: US 7,988,748 B2
(45) Date of Patent: Aug. 2, 2011

(54) ADDITIVE AS COMPONENT OF MINERAL OIL COMPOSITIONS

(75) Inventors: Hiltrud Täubert, Leissling (DE); Wolfgang Haubold, Merseburg (DE); Konrad Bühler, Pödelist (DE); Torsten Meyer, Chemnitz (DE)

(73) Assignee: Leuna Polymer GmbH (DE)

( * ) Notice: Subject to any disclaimer, the term of this patent is extended or adjusted under 35 U.S.C. 154(b) by 1031 days.

(21) Appl. No.: 10/576,898

(22) PCT Filed: Oct. 15, 2004

(86) PCT No.: PCT/DE2004/002315
§ 371 (c)(1),
(2), (4) Date: Mar. 14, 2007

(87) PCT Pub. No.: WO2005/040234
PCT Pub. Date: May 6, 2005

(65) Prior Publication Data
US 2007/0180761 A1    Aug. 9, 2007

(30) Foreign Application Priority Data

Oct. 22, 2003 (DE) .............................. 103 49 858
Oct. 22, 2003 (DE) .............................. 103 49 862

(51) Int. Cl.
*C10L 1/192*    (2006.01)
*C10M 145/00*    (2006.01)

(52) U.S. Cl. .............. 44/389; 44/391; 44/393; 508/469; 508/470; 508/471; 508/472

(58) Field of Classification Search ................ 44/62, 70, 44/383, 388, 389, 391, 393; 508/459, 475, 508/467, 468, 466, 469, 470, 471, 472; 524/475; 525/246

See application file for complete search history.

(56) References Cited

U.S. PATENT DOCUMENTS

| | | | | | |
|---|---|---|---|---|---|
| 2,922,768 A | * | 1/1960 | Mino et al. | .................... | 525/246 |
| 3,584,078 A | * | 6/1971 | Pilato | ............................. | 525/308 |
| 4,058,371 A | * | 11/1977 | Ilnyckyj | ........................ | 44/395 |
| 5,716,915 A | * | 2/1998 | Brown et al. | ................ | 508/467 |
| 5,998,530 A | * | 12/1999 | Krull et al. | .................... | 524/474 |
| 6,495,495 B1 | * | 12/2002 | Alger et al. | .................... | 508/475 |
| 7,377,949 B2 | * | 5/2008 | Krull et al. | ...................... | 44/388 |
| 2004/0060225 A1 | * | 4/2004 | Krull et al. | ...................... | 44/383 |

FOREIGN PATENT DOCUMENTS

| | | |
|---|---|---|
| EP | A-0 320 766 | 6/1989 |
| EP | A-0 485 774 | 5/1992 |

* cited by examiner

*Primary Examiner* — Ellen M McAvoy
*Assistant Examiner* — Latosha Hines
(74) *Attorney, Agent, or Firm* — Wood, Phillips, Katz, Clark & Mortimer

(57) ABSTRACT

Mineral oil compositions with trace portions of additives contain as additive a comb polymer containing ester linkages, either based on a) ethylene-vinylester copolymers modified by hydroxy groups or glycidyl groups with molecular mass weight averages from 3000 to 50000 and an ethylene portion of 50 to 90 mass %, and b) partially imidated and/or partially esterified maleic anhydride copolymers, wherein in the comb polymer based on a) and b) the modified ethylene-vinylester copolymer component is connected by means of ester linkages to the partially imidated and/or partially esterified maleic anhydride copolymer component, or a comb polymer containing ester linkages based on c) ethylene-vinylester copolymers modified by acid and/or acid anhydride groups with molecular mass weight averages from 3000 to 50000 and an ethylene portion of 50 to 90 mass %, and d) polyalcohols partially esterified with $C_{12}$-$C_{40}$-monocarboxylic acids wherein in the comb polymer based on c) and d) the ethylene-vinylester copolymer component modified by acid and/or acid anhydride groups is connected by means of ester linkages with the polyalcohol component partially esterified with $C_{12}$-$C_{40}$-monocarboxylic acids.

The mineral oil compositions are suitable as flowable media to be transported at low temperatures and as mineral oil fuels with high lubricity and flowability.

23 Claims, No Drawings

ADDITIVE AS COMPONENT OF MINERAL OIL COMPOSITIONS

The invention relates to an additive as component of mineral oil compositions with trace portions of additives and to a method for producing mineral oil compositions that contain the additive.

Compositions of mineral oil as the main component and trace portions of additive mixtures made of usual unmodified ethylene-vinylacetate copolymers, hydrocarbon polymers, esterified maleic anhydride-olefin copolymers, polar nitrogen compounds such as amine salts of multivalent carboxylic acids and esterified polyoxyalkylenes are known (WO 94/10 267 A1, WO 95/33 012 A1, EP 0 921 183 1, WO 93/14 178 A1, EP 0 889 323 A1).

Disadvantages include insufficient flow properties and stability in storage of these mineral oil compositions at low temperatures when the mineral oil component has a sulfur content below 0.005 percent by weight.

It is the object of this invention to provide an additive as component for mineral oil compositions containing mineral oil as their main component and trace portions of additives that have improved flow properties and improved stability in storage at low temperatures. The improved flow behavior is to result in energy savings at the pump sets through which these formulations are transported. These additives are to be developed taking into account that mineral oils with a very low sulfur content are to be used to make fuels with improved environmental compatibility as regards pollutant emissions.

The object of the invention was achieved by an additive as component of mineral oil compositions with trace portions of additives in which the additive according to the invention is a comb polymer containing ester linkages, either based on a) ethylene-vinylester copolymers modified by hydroxy groups or glycidyl groups with molecular mass weight averages from 3000 to 50000 and an ethylene portion of 50 to 90 mass %, and b) partially imidated and/or partially esterified maleic anhydride copolymers, wherein the modified ethylene-vinylester copolymer component in the comb polymer based on a) or b) is connected by means of ester linkages to the partially imidated and/or partially esterified maleic anhydride copolymer component, or a comb polymer containing ester linkages based on c) ethylene-vinylester copolymers modified by acid and/or acid anhydride groups with molecular mass weight averages from 3000 to 50000 and an ethylene portion of 50 to 90 mass %, and d) polyalcohols partially esterified with $C_{12}$-$C_{40}$-monocarboxylic acids the ethylene-vinylester copolymer component modified by acid and/or acid anhydride groups in the comb polymer based on c) and d) being connected by means of ester linkages with the polyalcohol component partially esterified with $C_{12}$-$C_{40}$-monocarboxylic acids, and whereby the content of the comb polymer in the mineral oil is 0.005 to 1 mass %, and the mass ratio of the segments comb polymer segment a/comb polymer segment b based on components a and b, or the segments comb polymer segment c/comb polymer segment d based on components c and d is 10:90 to 90:10, respectively.

Examples of vinylester components that may be contained as the basis of the comb polymers in the ethylene-vinylester copolymers modified by hydroxy groups or gly-cidyl cidyl groups or by acid and/or acid anhydride groups are vinyl acetate, vinyl propionate, 2-ethylhexyl vinylester, vinyl laurate, 2-hydroxyethyl vinylester, and 4-hydroxybutyl vinylester.

The ethylene-vinylester copolymers modified by hydroxy groups or by glycidyl groups or by acid and/or acid anhydride groups as the basis of the comb polymers may contain 1 to 30 mass %, in relation to the vinyl ester, of other unsaturated ester compositions such as (meth)acrylic esters like methyl methacrylate, methyl acrylate, ethyl methacrylate, butyl acrylate, 2-ethylhexyl acrylate, dodecyl acrylate, ethyleneglycol dimethacrylate or hydroxyethyl methacrylate and/or vinyl ethers such as octylvinyl ether or hexanediol monovinyl ether.

Preferred are the ethylene-vinylester copolymers modified by hydroxy groups or glycidyl groups or by acid and/or acid anhydride groups as the basis of the comb polymers modified ethylene-vinylacetate copolymers that have a vinylacetate content of 12 to 50 mass %.

Preferred are the ethylene-vinylester copolymers modified by hydroxy groups in the comb polymers based on a) or b) oxidized ethylene-vinylacetate copolymers with molecular mass number averages of 800 to 5000 and OH numbers from 10 to 150 mg KOH/g, or partially saponified ethylene-vinylacetate copolymers with molecular mass number averages of 800 to 5000, in which 3 to 30 mol % of the vinylacetate units are saponified, or hemiacetals of ethylene-vinylester-vinylalcohol copolymers with butyraldehyde.

Examples of hemiacetals of ethylene-vinylester-vinylalcohol copolymers with butyraldehyde are hemiacetals of ethylene-vinylacetate-vinylalcohol copolymers that were reacted in heterogenic phase with butyraldehyde as described in DD 295 507 A7.

Also preferred are ethylene-vinylester copolymers modified by hydroxy groups or glycidyl groups in the comb polymer based on a) and b) that contain 3 to 20 mass % of polar unsaturated monomers of the hydroxy-$C_2$-$C_{24}$-alkyl(meth)acryl ester or glycidyl(meth)acryl ester type as comonomer component in the ethylene-vinylester copolymer or grafted onto the ethylene-vinylester copolymer. Grafted ethylene-vinylester copolymers can be produced by reacting with unsaturated monomers in an extruder (DD 282 462 B5) or stirred tank reactor (DD 293 125 B5) in the presence of thermally decomposing radical formers. It is also possible to perform the modification during the production of the copolymer according to the high-pressure process by adding the monomer dose to the polymer melt in the low-pressure separator or in the discharging extruder.

The comb polymers in the mineral oil compositions may contain up to 35 mass % of poly-$C_6$-$C_{36}$-alkyl(meth)acrylate.

Examples of maleic anhydride copolymers that are present partially imidated or partially esterified as acid component in the comb polymers based on a) and b) are copolymers of maleic anhydride and the comonomer components $C_2$-$C_{20}$-olefins, $C_8$-$C_{20}$-vinyl aromatics, $C_4$-$C_{21}$-acrylic esters, $C_5$-$C_{22}$-methacrylic esters, $C_5$-$C_{14}$-vinylsilanes, $C_6$-$C_{15}$ acrylate silanes, acrylic acid, methacrylic acid, acrylonitrile, vinyl pyridine, vinyl oxazoline, isopropenyl oxazoline, vinyl pyrrolidone, amino-$C_1$-$C_8$-alkyl-(meth)acrylate, $C_3$-$C_{20}$-vinylester, $C_3$-$C_{20}$-vinylether and/or hydroxy-$C_1$-$C_8$-alkyl-(meth) acrylate. Particularly preferred comonomer components are isobutylene, diisobutylene, octadecene, vinylacetate, styrene, and α-methylstyrene.

The maleic anhydride copolymers as acid component b) in the comb polymers based on a) and b) preferably have a molar ratio of maleic anhydride to comonomer of 1:1 to 1:9 and molecular mass weight averages from 5000 to 500000. Partial imitation can be performed using ammonia, $C_1$-$C_{24}$-monoalkyl amines, $C_6$-$C_{18}$-aromatic monoamines, $C_2$-$C_{18}$- monoaminoalcohols, monoaminated poly ($C_2$-$C_4$-alkylene) oxides with a molar weight of 400 to 3000 and/or monoetherified poly ($C_2$-$C_4$-alkylene) oxides with a molar weight of 100 to 10000, the molar ratio of anhydride groups copolymer/ammonia, amino groups $C_1$-$C_{24}$-monoalkylamine, $C_6$-$C_{18}$-aromatic monoamines, $C_2$-$C_{18}$-monoaminoalcohols, or monoaminated poly-($C_2$-$C_4$-alkylene) oxide and/or hydroxy groups poly-($C_2$-$C_4$-alkylene) oxide, respectively, is 1:1 to 20:1.

Examples of suitable amines with which the maleic anhydride copolymers as acid component b) in the comb polymers based on a) and b) are partially imidated are monoalkyl amines such as oleylamine, dodecylamine, hexadecylamine, octadecylamine, or eicosylamine, monosubstituted diamines such as N-dodecyl-1,3-diaminopropane, N-octadecyl-1,3-diaminopropane, or N-octadecy propylene triamine, or aminoalcohols such as aminodecane-10-ol or aminohexadecane-16-ol.

Examples of suitable alcohols with which the maleic anhydride copolymers as acid component b) in the comb polymers based on a) and b) are partially esterified are $C_1$-$C_8$-alcohols such as methanol, ethanol, ethyl hexanol, or stearyl alcohol.

Preferred are the partially imidated maleic anhydride copolymers connected by means of ester linkages contained as component b) in the comb polymer based on a) and b) maleic anhydride-α-methylstyrene copolymers partially imidated with $C_6$-$C_{24}$-monoalkylamines in which the molar ratio of anhydride groups in the copolymer to bound $C_6$-$C_{24}$-monoalkylamine in the copolymer is 4:1 to 1.1:1.

Examples of suitable methods for producing the comb polymers based on a) and b) in which the modified ethylenevinylester copolymer component a) is connected to the partially imidated and/or partially esterified maleic anhydride copolymer component b) by means of ester linkages are the reaction of ethylene-vinylester copolymers modified by hydroxy groups or glycidyl groups with partially imidated and/or partially esterified maleic anhydride copolymers in the melt, preferably in continuous kneaders at temperatures from 50 to 135° C. under vacuum degassing or in solution, preferably in aromatic solvents at 85 to 140° C.

Preferred ethylene-vinylester copolymers modified by acid groups in the comb polymer based on c) and d) are oxidized ethylene-vinylacetate copolymers with molecular. mass number averages from 800 to 5000 and acid numbers from 5 to 40 mg KOH/g.

Other preferred ethylene-vinylester copolymers modified by acid and/or acid anhydride groups in-the comb polymer based on c) and d) are copolymers of ethylene, vinyl esters and 1 to 20 mass % unsaturated carboxylic acids and/or carboxylic anhydrides, particularly acrylic acid, methacrylic acid and/or maleic anhydride, or ethylene-vinylester copolymers grafted with 1 to 20 mass % unsaturated carboxylic acids and/or carboxylic anhydrides, particularly acrylic acid, methacrylic acid and/or maleic anhydride.

Examples of unsaturated carboxylic acids that may be contained as ter component in the copolymers of ethylene, vinyl esters and 1 to 20 mass % unsaturated carboxylic acids of the comb polymer component c) and grafted on in the grafted ethylene-vinylester copolymers are aconitic acid, acrylic acid, and methacrylic acid.

Examples of unsaturated carboxylic acid anhydrides that may be contained as ter component in the copolymers of ethylene, vinyl esters and 3 to 20 mass % unsaturated carboxylic acids of the comb polymer component c) and grafted on in the grafted ethylene-vinylester copolymers are allylsuccinic anhydride, bicycloheptene dicarboxylic anhydride, bicyclooctene dicarboxylic anhydride, carbomethoxymaleic anhydride, citraconic anhydride, cyclohexene dicarboxylic anhydride, dodecencyl succinic anhydride, glutaconic anhydride, itaconic anhydride, maleic anhydride, mesaconic anhydride, methylbicycloheptene dicarboxylic anhydride and/or methylcyclohexane dicarboxylic anhydride.

Particularly preferred as unsaturated carboxylic acids and/or carboxylic anhydrides that may be contained as ter component in the copolymers of ethylene, vinyl esters and 3 to 20 mass % unsaturated carboxylic acids of the additive component c) and grafted on in the grafted ethylene-vinylester copolymers are acrylic acid, methacrylic acid, and maleic anhydride.

Grafted ethylene-vinylester copolymers can be produced by reacting with the unsaturated monomers containing acid or acid anhydride groups in an extruder (DD 282 462 B5) or stirred tank reactor (DD 293 125 B5) in the presence of thermally decomposing radical formers. It is also possible to perform the modification during the production of the copolymer according to the high-pressure process by adding the monomer dose to the polymer melt in the low-pressure separator or in the discharging extruder.

Examples of polyalcohols that are contained as alcohol component in the polyalcohols partially esterified with $C_{12}$-$C_{40}$-monocarboxylic acids of the comb polymer component d) in the additive mixture are ethylene glycol, glycerine, 1,1,1-tris-(hydroxymethyl) propane, pentaerythrite, and sorbite as well as polyalkylene glycols with molar weights from 500 to 5000 such as polyethylene glycol, polypropylene glycol, and ethylene oxide-propylene oxide copolymers.

Examples of $C_{12}$-$C_{40}$-monocarboxylic acids that are contained as carboxylic acid component in the polyalcohols partially esterified with $C_{12}$-$C_{40}$-monocarboxylic acids of the comb polymer component d) are laurinic acid, palmitic acid, stearic acid, oleic acid, elaidic acid, ricinoleic acid, eleostearic acid, linolic acid, linolenic acid, and erucic acid, or dimeric acids based on oleic acid or linolenic acid.

Also preferred as polyalcohols partially esterified with $C_{12}$-$C_{40}$-monocarboxylic acids as comb polymer component d) are mixed esters of polyalcohols in which the polyalcohols are partially esterified by mixtures of $C_{12}$-$C_{40}$-monocarboxylic acids. Special examples of such mixed esters are the monoester of ethylene glycol with dilinolenic acid, a $C_{36}$-dimeric acid, the monoester of propylene glycol with oleic acid, and the diester of pentaerythrite with stearic acid.

The polyalcohols partially esterified with $C_{12}$-$C_{40}$-monocarboxylic acids in the comb polymer based on c) and d) preferably are glycerine esters of unsaturated $C_{16}$-$C_{24}$-monocarboxylic acids in which the portion of $C_{22}$-monocarboxylic acids in relation to the total weight of $C_{16}$-$C_{24}$-monocarboxylic acids is 45 to 52 mass %.

Examples of suitable methods for producing the comb polymers based on c) and d) in which the ethylene-vinylester copolymer component modified by acid and/or acid anhydride groups is connected to the polyalcohol component partially esterified with $C_{12}$-$C_{40}$-monocarboxylic acids by means of ester linkages are the reaction of ethylene-vinylester copolymers modified by acid and/or acid anhydride groups with polyalcohols partially esterified with $C_{12}$-$C_{40}$-monocarboxylic acids in the melt, preferably in continuous kneaders at temperatures from 50 to 135° C. under vacuum degassing or in solution, preferably in aromatic solvents at 85 to 140° C.

Examples of mineral oils that form the main component in the mineral oil compositions are crude oils and petroleum distillates with a distillation range from 100 to 500° C. such as lubricating oils, kerosine, diesel oil, heating oil, heavy heating oils, petroleum, tractor fuel, and cracked gasoline. The mineral oils may also contain up to 30 mass % of synthesized hydrocarbons from the Fischer-Tropsch process, up to 20 mass % of modified vegetable oils based on sunflower oil, soybean oil, rape-seed oil, or animal oils, biodiesel and/or up to 10 mass % of alcohols such as methanol or ethanol.

The mineral oil compositions preferably contain as mineral oils crude oils, or fuel oils from a middle distillate with a sulfur content of under 0.05 mass %, particularly heating oils, gas oils, or diesel oils.

The compositions of mineral oil may contain a total of up to 200 mass % in relation to the comb polymer of other additive components of the type of fatty acid mixtures, polar nitrogen compounds, preferably polyamines, etheramines, aminoalcohols, amine salts, amides or imides of multivalent carboxylic acids; modified copolymers of ethylenically unsaturated $C_4$-$C_{20}$-dicarboxylic anhydrides, non-modified ethylene-vinylester copolymers, $C_7$-$C_{30}$-alcohols, polyalkylene glycols, esters or ethers of polyoxyalkylene compounds, $C_2$-$C_6$-oxyalkyl-bridged $C_{12}$-$C_{40}$-monocarboxylic acids, preferably $C_3$-$C_4$-oxyalkyl-bridged unsaturated $C_{16}$-$C_{24}$-monocarboxylic acids with a content of $C_{22}$-monocarboxylic acids in relation to the overall weight of the $C_{16}$-$C_{24}$-monocarboxylic acids of 45 to 52 mass %, hydrocarbon polymers, alkylphenol-aldehyde co-polymers, aromatic compounds with $C_8$-$C_{100}$-alkyl substituents, carboxylated polyamines, detergents, corrosion in-hibitors, demulsifiers, metal deactivators, cetane number improvers, defoaming agents and/or cosolvents.

Examples of the fatty acid mixtures contained as other additive components in the mineral oil compositions are mixtures of saturated and/or unsaturated $C_6$-$C_{40}$-carboxylic acids such as lauric acid, palmitic acid, oleic acid, linolenic acid, dimeric fatty acids, and alkenyl succinic acids.

Examples of the polar nitrogen compounds of the polyamine type contained as other additive components in the mineral oil compositions are N-hexadecyl-1,3-diaminopropane, N-octadecyl dipropylenetriamine, N-dodecyl-1,3-diaminopropane, N,N'-didodecyl-1,3-diaminopropane, and N,N'-dioctadecyl dipropylenetriamine.

Examples of polar nitrogen compounds of the etheramine type contained as other additive components in the mineral oil compositions are 3-methoxypropylamine, 3-N-octy-loxypropyl-1,3-diaminopropane, and 3-N-(2,4,6-trimethyldecyloxypropyl)-1,3-diaminopropane.

Examples of polar nitrogen compounds of the amino alcohol type contained as other additive components in the mineral oil compositions are aminopentane-5-ol, aminoun-decane-11-ol, and 2-amino-2-methylpropanol.

Examples of the amines on which polar nitrogen compounds of the amine salt, amide, or imide type of multivalent carboxylic acids are based are $C_8$-$C_{40}$-amines such as hydrated tallamine, tetradecylamine, eicosylamine, dioctadecylamine, methyl behenylamine, N-oleyl-1,3-diaminopropane, N-stearyl-1-methyl-1,3-diaminopropane, or N-oleyl-dipropylenetriamine.

Examples of the multivalent carboxylic acids on which polar nitrogen compounds of the amine salt or amide of multivalent carboxylic acids types are based are phthalic acid, isophthalic acid, terephthalic acid, naphthaline dicarboxylic acid, ethylene diamine tetraacetic acid, and cyclohexane dicarboxylic acid.

Special examples of the polar nitrogen compounds of the amine salt type contained as other additive components in the mineral oil compositions are N-methyl triethanol ammonium distearyl ester chloride and N-methyl triethanol ammonium distearyl ester methosulfate.

Examples of $C_7$-$C_{30}$-alcohols that can be contained as other additive components in the mineral oil compositions are dodecanol, stearyl alcohol, and ceryl alcohol.

Examples of polyalkylene glycols that can be contained as other additive components in the mineral oil compositions are polyethylene glycols, polypropylene glycols, and ethylene oxide propylene oxide copolymers with molar weights from 500 to 5000.

Examples of ethylenically unsaturated $C_4$-$C_{20}$-dicarboxylic anhydrides that may be contained as the monomeric component in the modified copolymers of ethylenically unsaturated $C_4$-$C_{20}$-dicarboxylic anhydrides as other additive components are allylsuccinic anhydride, bicycloheptene dicarboxylic anhydride, bicyclooctene dicarboxylic anhydride, carbomethoxymaleic anhydride, citraconic anhydride, cyclohexene dicarboxylic anhydride, dodecencyl succinic anhydride, glutaconic anhydride, itaconic anhydride, maleic anhydride, mesaconic anhydride, methyl bicycloheptene dicarboxylic anhydride and/or methyl cyclohexene dicarboxylic anhydride, of which maleic anhydride and/or itaconic anhydride are preferred.

Examples of suitable comonomers for ethylenically unsaturated $C_4$-$C_{20}$-dicarboxylic anhydrides that may be contained as the monomeric component in the modified copolymers of ethylenically unsaturated $C_4$-$C_{20}$-dicarboxylic anhydrides as other additive components are ethylenically unsaturated monomers such as $C_2$-$C_{20}$-olefins, $C_8$-$C_{20}$-vinylaromatics, $C_4$-$C_{21}$-acrylic esters, $C_5$-$C_{22}$-methacrylic esters, $C_5$-$C_{14}$-vinylsilanes, $C_6$-$C_{15}$-acrylate silanes, acrylic acid, methacrylic acid, acrylonitrile, vinyl pyridine, vinyl oxazoline, isopropenyl oxazoline, vinyl pyrrolidone, amino-$C_1$-$C_8$-alkyl-(meth) acrylate, $C_3$-$C_{20}$-vinylester, $C_3$-$C_{20}$-vinylether and/or hydroxy-$C_1$-$C_8$-alkyl-(meth)acrylate. Particularly preferred ethylenically unsaturated monomers are isobutylene, diisobutylene, vinylacetate, styrene and α-methylstyrene.

Particularly preferred as modified copolymers are copolymers of $C_4$-$C_{20}$-ethylenically unsaturated acid anhydrides and ethylenically unsaturated monomers with a molar ratio from 1:1 to 1:9 and molecular mass weight averages from 5000 to 500000 that were reacted with ammonia, $C_1$-$C_{24}$-monoalkyl amines, $C_6$-$C_{18}$-aromatic monoamines, $C_2$-$C_{18}$-monoaminoalcohols, monoaminated poly($C_2$-$C_4$-alkylene) oxides with a molar weight of 400 to 3000 and/or monoetherified poly($C_2$-$C_4$-alkylene) oxides with a molar weight of 100 to 10000, the molar ratio of anhydride groups copolymer/ammonia, amino groups $C_1$-$C_{24}$-monoalkylamine, $C_6$-$C_{18}$-aromatic monoamines, $C_2$-$C_{18}$-monoaminoalcohols or monoaminated poly-($C_2$-$C_4$-alkylene) oxide amino groups, respectively, being in the range from 1:1 to 20:1.

Particularly suited as other additive components in the form of modified copolymers of ethylenically unsaturated $C_4$-$C_{20}$-dicarboxylic anhydrides are maleic anhydride copolymers imidated with $C_{12}$-$C_{24}$-monoalkyl amines such as oleylamine, dodecylamine, hexadecylamine, octadecylamine, or eicosylamine, monosubstituted diamines such as N-dode-cyl-1,3-diaminopropane, N-octadecyl-1,3-diaminopropane, or N-octadecyl propylene triamine, or aminoalcohols such as aminodecane-10-ol or aminohexadecane-16-ol.

The $C_2$-$C_6$-oxyalkyl-bridged $C_{12}$-$C_{40}$-monocarboxylic acids that may be contained as other additive components in the mineral oil compositions consist of a $C_2$-$C_6$-polyalcohol component and a $C_{12}$-$C_{40}$-monocarboxylic acid component.

Examples of polyalcohols that may be contained as alcohol component in the $C_2$-$C_6$-oxyalkyl-bridged $C_{12}$-$C_{40}$-monocarboxylic acids are ethylene glycol, polyalkylene glycols, glycerine, 1,1,1-tris-(hydroxymethyl) propane, pentaerythrite, and sorbite.

Examples of $C_{12}$-$C_{40}$-monocarboxylic acids that may be contained as carboxylic acid component in the $C_2$-$C_6$-oxyalkyl-bridged $C_{12}$-$C_{40}$-monocarboxylic acid are laurinic acid, palmitic acid, stearic acid, oleic acid, elaidic acid, ricinoleic acid, eleostearic acid, linolic acid, linolenic acid, and erucic acid or dimeric acids based on oleic acid or linolenic acid.

The mineral oil compositions with trace portions of additives are produced using a method in which, according to the invention, mineral oil compositions that have as an additive a comb polymer containing ester linkages, either based on a) ethylene-vinylester copolymers modified by hydroxy groups or glycidyl groups with molecular mass weight averages from 3000 to 50000 and an ethylene portion of 50 to 90 mass %, and b) partially imidated and/or partially esterified maleic anhydride copolymers, wherein the modified ethylene-vinylester copolymer component in the comb polymer based on a) or b) is connected by means of ester linkages to the partially imidated and/or partially esterified maleic anhydride copolymer component, or a comb polymer containing ester linkages based on c) ethylene-vinylester copolymers modified by acid and/or acid anhydride groups with molecular mass weight averages from 3000 to 50000 and an ethylene portion of 50 to 90 mass %, and d) polyalcohols partially esterified with $C_{12}$-$C_{40}$-monocarboxylic acids the ethylene-vinylester copolymer component modified by acid and/or acid anhydride groups in the comb polymer based on c) and d) being connected by means of ester linkages with the polyalcohol component partially esterified with $C_{12}$-$C_{40}$-monocarboxylic acids, and whereby the content of the comb polymer in the mineral oil is 0.005 to 1 mass %, and the mass ratio of the segments comb polymer segment a/comb polymer segment b based on components a and b, or the segments comb polymer segment c/comb polymer segment d based on components c and d is 10:90 to 90:10, respectively, are produced in a prehomogenization process in which
  solutions containing 1 to 60 mass % of comb polymer in mineral oil middle distillates are produced at 20 to 90° C. in a first process step, and
  the solutions containing the comb polymer are homogenized with the mineral oil as the main component in a second process step, while other additive components of a total of 0 to 200 mass % in relation to the comb polymer are added to the mineral oil in either the first or second process step.

The mineral oil compositions with trace additive portions are particularly suited as flowable media to be transported at low temperatures and as mineral oil fuels of high lubricity and flowability.

The invention is explained in greater detail by the examples below.

EXAMPLES

The characteristic numbers were determined in accordance with the following test methods:
Cloud point (CP): DIN EN 23 015
Cold filter plugging point (CFPP): EN 116
Distillation analysis: EN ISO 3405, ASTM D 86
IBP : Initial Boiling Point
FBP : Final Boiling Point Vinyl Acetate Content: Modified Method According to ISO 8995, DIN 16778 Part 2:

2 g of sample are weighed in with 0.001 g precision and dissolved in a 300 ml Erlenmeyer flask with 70 ml distilled xylene and 2 boiling beads under refluxing for ca. 15 minutes. Then ca. 30 ml of ethanol are slowly added via the reflux cooler, the Erlenmeyer flask is taken off the heating plate, 30 ml of ethanol, 0.5 n KOH from the burette and 2 boiling beads are added, and the sample is refluxed for 1 hour. The sample is taken off the reflux again, mixed with 30 ml of methanolic-aqueous 0.5 n HCl and 2 boiling beads, and refluxed for another 15 minutes. After adding 2 to 3 drops of phenolphthaleine solution (1 mass % in ethanol), the sample is titrated drop by drop under shaking with ethanolic 0.5 n KOH until its color changes to red. A blank value has to be determined at the sameime.

$$\text{Vinyl acetate content in mass \%} = \frac{(V - BV) \times F \times 43}{10 \times E}$$

E=original sample weight in g
F=factor of the ethanolic 0.5 n KOH
V=consumption in ml of 0.5 n ethanolic KOH for the sample
B=consumption in ml of 0.5 n ethanolic KOH for the blank value Short-time Sedimentation Test:

To test the sedimentation tendency of recrystallized paraffins in mineral oil, a 500 ml sample is stored in a graduated cylinder for 16 hours, then the top 80 volume percent of the sample are drawn off and discarded. The remaining 20 vol % of the sample (100 ml) are homogenized at 40° C., then the cloud point (CP) is determined according to DIN EN 23 015.

SEDAB Filtration Test:

A 500 ml mineral oil sample is shaken vertically 20 times, kept at 10° C. for 16 hours, shaken vertically 10 times, and the entire sample is filtered all at once through a filter of cellulose nitrate (50 mm in diameter, 0.8 pm pore size) that sits on a suction cap with a vacuum of approx. 200 hPa. The time in which the sample runs through the filter is measured. The SEDAB filtration test is deemed passed if the sample passes through the filter in a period <120 s.

Example 1

1.1 Starting Materials
1.1.1 Diesel without Additives
Batch: 16080601 test DF 1
Characterization:
Cloud point (CP): +6° C.;
Cold filter plugging point (CFPP): +2° C.

Distillation Analysis:

| Distilled quantity (vol. %)/temperature (° C.) | | | | | | | | | | |
|---|---|---|---|---|---|---|---|---|---|---|
| IBP | 10 | 20 | 30 | 40 | 50 | 60 | 70 | 80 | 90 | FBP |
| 189 | 243 | 259 | 271 | 281 | 292 | 303 | 317 | 334 | 357 | 385 |

1.1.2 Additive: Comb Polymer Based on a) and b)

Comb polymer of hydroxyethylmethacrylate-grafted ethylene-vinylacetate copolymer wax a) (vinylacetate content 32 mass %, hydroxyethyl-methacrylate content 4 mass %, molecular mass weight average 4500 g/mol) and an α-methylstyrene-maleic anhydride copolymer b) partially imidated with $C_{16}$-$C_{18}$-fatty amine (molar ratio 1.3:1.0, acid number 27, molecular mass number average 9500)

Synthesis of the Grafted Copolymer Wax as Comb Polymer Component a)

Ethylene-vinylacetate copolymer wax (manufactured by LEUNA Polymer GmbH, vinylacetate content 32 mass %, molecular mass weight average 2300 g/mol), powdered with 0.2 mass % talc, is grafted according to DD 282 462 A5 at 90° C. in an extruder by adding a dose of 2 mass % hydroxyethyl methacrylate containing azoisobutyric dinitrile and the melt of the grafted copolymer is placed in a briqueting press with a cooling conveyor, molded into pastilles and powdered with 0.2 mass % of talc.

Production of the Comb Polymer From a) and b)

An α-methylstyrene-maleic anhydride copolymer b) partially imidated with $C_{16}$-$C_{18}$-fatty amine (molar ratio 1.3:1.0, acid number 27, molecular mass number average 9500) is dosed via a belt weigher continuous scale at 3.0 kg/h into the feed screw of a Werner&Pfleiderer ZSK 30 twin-screw extruder, L/D ratio 48, with side stream dosing unit for liquid media and two vacuum degassing zones, and dissolved by heat at 95° C. An ethylene-vinylacetate copolymer wax a) grafted with hydroxyethyl methacrylate (vinylacetate content 32 mass %, hydroxyethyl methacrylate content 4 mass %, molecular mass weight average 4500 g/mol) is added to the melt at 2.1 kg/h via the side stream dosing unit from a storage tank heated at 115° C., the melt is reacted in the first reaction zone (dwell time 4.5 min) at 120° C., degassed, reacted in the second reaction zone at 130° C. (dwell time 3.5 min), degassed, delivered at 100° C. into a self-cleaning melt filter using a melt gear pump (extrex SP, Maag pump systems) and molded into pastilles in a briqueting press with cooling conveyor.

The resulting comb polymer has an acid number of 3.5 and a melting range from 72 to 79° C.

1.1.3 Other Additive Components

Ethylacrylate-octadecylacrylate copolymer (molar ratio 2:1, molecular mass number average 7500)

1.2 Production of Solutions Containing the Additive Components in Mineral Oil Middle Distillates 50 kg of a 50% solution of the comb polymer based on a) and b) in an aromatic hydrocarbon mixture (Solvesso), 25 kg of another additive component, glycerine dioleyl ester, and 15 kg of a 20% solution of yet another additive component, ethylacrylate-octadecylacrylate copolymer in toluene, are stirred in a stirred tank reactor for 120 minutes at 65° C., and the mixture is transferred into a storage tank.

1.3 Production of the Mineral Oil Compositions

The additive solution according to 1.2 is injected at 0.48 kg/min into a product stream of diesel without additives, batch 16080601, flowing at 800 kg/min and the mixture is transferred into a storage tank.

Testing the mineral oil formulation for low-temperature resistance revealed a CFPP value of −16° C. The CP value of the short-time sedimentation test is +60° C. The SEDAB filtration test is deemed passed (500 ml in 88 s).

If a mineral oil formulation containing only the unmodified ethylene-vinylacetate copolymer wax as an additive is produced under the same conditions, the CFPP value is −3° C. The CP value of the short-time sedimentation test is +10° C. The SEDAB filtration test is deemed failed (471 ml in >120 s).

Example 2

2.1 Starting Materials
2.1.1 Diesel without Additives
Batch: 030210 test DF 2
Characterization:
Cloud point (CP): +7° C.;
Cold filter plugging point (CFPP): +2° C.
Distillation Analysis:

| Distilled quantity (vol. %)/temperature (° C.) | | | | | | | | | | |
|---|---|---|---|---|---|---|---|---|---|---|
| IBP | 10 | 20 | 30 | 40 | 50 | 60 | 70 | 80 | 90 | FBP |
| 235 | 266 | 279 | 291 | 301 | 310 | 320 | 337 | 342 | 357 | 374 |

2.1.2 Additive: Mixture of the Comb Polymer Based on a) and b) with Copolymer Wax Mixture of 15 mass % of ethylene-vinylacetate copolymer wax (manufactured by LEUNA Polymer GmbH, vinylacetate content 29.5 mass %, molecular mass number average 2015 g/mol) and 85 mass % of a comb polymer of an oxidized ethylene-vinylacetate copolymer wax a) (molecular mass weight average 1150 g/mol, acid number 6 mg KOH/g, OH number 32 mg KOH/g) and a maleic anhydride-octadecene copolymer partially esterified with dodecylalcohol b) (molar ratio 1.6:1, acid number 32, melting point 49 to 52° C.).

Production of the Comb Polymer Based on a) and b)

A maleic anhydride-octadecene copolymer partially esterified with dodecylalcohol b) (molar ratio 1.6:1, acid number 32, melting point 49 to 52°) is dosed at 3.2 kg/h via a belt weigher continuous scale into the feed screw of a Werner&Pfleiderer ZSK 30 twin-screw extruder, L/D ratio 48, with a side stream dosing unit for liquid media and two vacuum degassing zones, and melted at 85° C. An oxidized ethylene-vinylacetate copolymer wax a) (molecular mass weight average 1150 g/mol, acid number 6 mg KOH/g, OH number 32 mg KOH/g) is added to the melt at 2.85 kg/h via the side stream dosing unit from a storage tank heated at 105° C., the melt is reacted in the first reaction zone (dwell time 4.5 min) at 120° C., degassed, reacted in the second reaction zone at 130° C. (dwell time 3.5 min), degassed, delivered at 100° C. into a self-cleaning melt filter using a melt gear pump (extrex SP, Maag pump systems) and molded into pastilles in a briqueting press with cooling conveyor.

The resulting comb polymer has an acid number of 2.5 and a melting range from 58 to 66° C.

2.1.3 Other Additive Components
Pentaerythrite trierucic ester
Ethylacrylate-octadecylacrylate copolymer (molar ratio 2:1, molecular mass number average 13500)

2.2 Production of Solutions Containing the Additive Components in Mineral Oil Middle Distillates 25 kg of a 60% solution of the mixture of the comb polymer based on a) and b) with copolymer wax in a $C_8$-$C_9$-diesel aromatic fraction, 10 kg of another additive component, pentaerythrite trierucic ester, and 7 kg of a 20% solution of yet another additive component, ethylacrylate-octadecylacrylate copolymer in toluene, are mixed in a stirred tank reactor for 120 minutes at 65° C., and the mixture is transferred into a storage tank.

2.3 Production of the Mineral Oil Compositions

The additive solution according to 2.2 is injected at 0.12 kg/min into a product stream of diesel without additives, batch 030210, flowing at 800 kg/min and the mixture is transferred into a storage tank.

Testing the mineral oil formulation for low-temperature resistance revealed a CFPP value of −8° C. The CP value of the short-time sedimentation test is +7° C. The SEDAB filtration test is deemed passed (500 ml in 85 s).

If a mineral oil formulation containing only the copolymer wax as an additive is produced under the same conditions, the CFPP value is −5° C. The CP value of the short-time sedimentation test is +12° C. The SEDAB filtration test is deemed failed (468 ml in >120 s).

Example 3

3.1 Starting Materials
3.1.1 Heating Oil without Additives
Batch: 030225 test HEL 1
Characterization:
Cloud point (CP): +1° C.;
Cold filter plugging point (CFPP): −1° C.
Distillation Analysis:

| Distilled quantity (vol. %)/temperature (° C.) | | | | | | | | | | | |
| --- | --- | --- | --- | --- | --- | --- | --- | --- | --- | --- | --- |
| IBP | 10 | 20 | 30 | 40 | 50 | 60 | 70 | 80 | 90 | FBP |
| 165 | 196 | 213 | 230 | 249 | 269 | 290 | 310 | 327 | 344 | 363 |

3.1.2 Additive: Mixture of the Comb Polymer Based on a) and b) with Copolymer Wax Mixture of 25 mass % of ethylene-vinylacetate copolymer wax (CW2) (manufactured by LEUNA Polymer GmbH, vinylacetate content 32 mass %, molecular mass weight average 2300 g/mol) as another additive component and 75 mass % of a comb polymer of a partially saponified ethylene-vinylacetate copolymer wax a3) (molecular mass weight average 850 g/mol, OH number 16) and a maleic anhydride-styrene copolymer partially imidated with $C_{16}$-$C_{18}$-fatty amine b) (molar ratio 1:2, acid number 19, melting point 55 to 59° C.).

Production of the Comb Polymer from a) and b)

A maleic anhydride-styrene copolymer partially imidated with $C_{16}$-$C_{18}$-fatty amine (molar ratio 1:2, acid number 19, melting point 55 to 59° C.) is dosed at 4.2 kg/h via a belt weigher continuous scale into the feed screw of a Werner&Pfleiderer ZSK 30 twin-screw extruder, L/D ratio 48, with side stream dosing unit for liquid media and two vacuum degassing zones, and dissolved by heat at 90° C. A partially saponified ethylene-vinylacetate copolymer wax a) (molecular mass weight average 850 g/mol, OH number 16) is added to the melt at 3.15 kg/h via the side stream dosing unit from a storage tank heated at 105° C., the melt is reacted in the first reaction zone (dwell time 4.5 min) at 120° C., degassed, reacted in the second reaction zone at 130° C. (dwell time 3.5 min.), degassed, delivered at 100° C. into a self-cleaning melt filter using a melt gear pump (extrex SP, Maag pump systems) and molded into pastilles in a briqueting press with cooling conveyor. The resulting comb polymer has an acid number of 2.0 and a melting range from 65 to 74° C.

3.1.3 Other Additive Components
Ethylene glycoldiolic ester
Polyethylene glycol, Molar Weight 1500

3.2 Production of Solutions Containing the Additive Components in Mineral Oil Middle Distillates 25 kg of a 60% solution of the mixture of the comb polymer based on a) and b) with copolymer wax in a $C_8$-$C_9$-diesel aromatic fraction, 9 kg of another additive component, ethylene glycoldiolic ester, and 4 kg of yet another additive component, polyethylene glycol (molar weight 1500) are mixed in a stirred tank reactor for 120 minutes at 65° C., and the mixture is cooled down to room temperature and transferred into a storage tank.

3.3 Production of the Mineral Oil Compositions

The additive solution according to 3.2 is injected at 0.24 kg/min into a product stream of heating oil without additives, batch 030225, flowing at 800 kg/min, and the mixture is transferred into a storage tank.

Testing the mineral oil formulation for low-temperature resistance revealed a CFPP value of −15° C.

If a mineral oil formulation containing only the unmodified copolymer wax as an additive is produced under the same conditions, the CFPP value is −120° C.

Example 4

4.1 Starting Materials
4.1.1 Diesel without Additives
Batch: 16080601 test DF 1
Characterization:
Cloud point (CP): +6° C.;
Cold filter plugging point (CFPP): +2° C.

Distillation Analysis:

| Distilled quantity (vol. %)/temperature (° C.) | | | | | | | | | | |
|---|---|---|---|---|---|---|---|---|---|---|
| IBP | 10 | 20 | 30 | 40 | 50 | 60 | 70 | 80 | 90 | FBP |
| 189 | 243 | 259 | 271 | 281 | 292 | 303 | 317 | 334 | 357 | 385 |

4.1.2 Additive: Mixture of the Comb Polymer Based on a) and b) with Copolymer Wax Mixture of 25 mass % of ethylene-vinylacetate copolymer wax (manufactured by LEUNA Polymer GmbH, vinylacetate content 32 mass %, molecular mass weight average 2300 g/mol) and 75 mass % of a comb polymer of an ethylene-vinylacetate-glycidyl methacrylate-terpolymer wax a) (vinylacetate content 28 mass %, glycidyl methacrylate content 3.5 mass %, molecular mass weight average 4200 g/mol) and an octadecene-maleic anhydride copolymer b) partially imidated with $C_{16}$-$C_{18}$-fatty amine (molar ratio 1:1.5, acid number 25, molecular mass number average 1800).

Production of the Comb Polymer from a) and b)

An octadecene-maleic anhydride copolymer b) partially imidated with $C_{16}$-$C_{18}$-fatty amine (molar ratio 1:1.5, acid number 25, molecular mass number average 1800) is dosed at 2.9 kg/h via a belt weigher continuous scale into the feed screw of a Werner&Pfleiderer ZSK 30 twinscrew extruder, L/D ratio 48, with side stream dosing unit for liquid media and two vacuum degassing zones, and dissolved by heat at 95° C. An ethylene-vinylacetate-glycidyl methacrylate terpolymer wax a) (vinylacetate content 28 mass %, glycidyl methacrylate content 3.5 mass %, molecular mass weight average 4200 g/mol) is added to the melt at 3.0 kg/h via the side stream dosing unit from a storage tank heated at 100° C., the melt is reacted in the first reaction zone (dwell time 4.5 min) at 115° C., degassed, reacted in the second reaction zone at 130° C. (dwell time 3.5 min), degassed, delivered at 90° C. into a self-cleaning melt filter using a melt gear pump (extrex SP, Maag pump systems) and molded into pastilles in a briqueting press with cooling conveyor.

The resulting comb polymer has an acid number of 2.2 and a melting range from 64 to 72° C.

4.1.3 Other Additive Components
Glycerine dioleyl ester
Friedel-Krafts condensate of chlorinated polyethylene wax with naphthaline, molecular mass weight average 850

4.2 Production of Solutions Containing the Additive Components in Mineral Oil Middle Distillates 25 kg of a 50% solution of the mixture of the comb polymer based on a) and b) with copolymer wax in an aromatic hydrocarbon mixture (Solvesso), 10 kg of another additive component, glycerine dioleyl ester, and 1 kg of a 10% solution of yet another additive component, Friedel-Krafts condensate of chlorinated polyethylene wax with naphthaline in $C_8$-$C_9$-diesel aromatic fraction are mixed in a stirred tank reactor for 120 minutes at 65° C., and the mixture is transferred into a storage tank.

4.3 Production of the Mineral Oil Compositions

The additive solution according to 4.2 is injected at 0.48 kg/min into a product stream of diesel without additives, batch 16080601, flowing at 800 kg/min and the mixture is transferred into a storage tank.

Testing the mineral oil formulation for low-temperature resistance revealed a CFPP value of −10° C.

If a mineral oil formulation containing only the unmodified ethylene-vinylacetate copolymer wax as an additive is produced under the same conditions, the CFPP value is −3° C.

Example 5

5.1 Starting Materials
5.1.1 Diesel without Additives
Batch: 16080601 test DF 1
Cloud point (CP): +6° C.;
Cold filter plugging point (CFPP): +2° C.
Lubricity test: 563 μm
Distillation Analysis:

| Distilled quantity (vol. %)/temperature (° C.) | | | | | | | | | | |
|---|---|---|---|---|---|---|---|---|---|---|
| IBP | 10% | 20% | 30% | 40% | 50% | 60% | 70% | 80% | 90% | FBP |
| 189 | 243 | 259 | 271 | 281 | 292 | 303 | 317 | 334 | 357 | 385 |

5.1.2 Additive: Comb Polymer Based on c) and d)

Comb polymer of ethylene-vinylacetate copolymer wax c) grafted with maleic anhydride (vinylacetate content 32 mass %, maleic anhydride content 3.2 mass %, molecular mass weight average 3500 g/mol) and an ester of glycerine and an erucic/oleic/linolic/linolenic acid mixture d) (molar ratio 6:1:1:1, degree of esterification 74 mol %)

Production of the Copolymer Wax c) Grafted with Maleic Anhydride:

Ethylene-vinylacetate copolymer wax (manufactured by LETNA Polymer GmbH, vinylacetate content 32 mass %, molecular mass weight average 2300 g/mol), powdered with 0.2 mass % talc, is grafted with maleic anhydride according to DD 282 462 A5 at 80° C. in an extruder by dosing in a solution containing 1 mass % azoisobutyric dinitrile and 30 mass % of maleic anhydride in acetone, and the melt of the grafted copolymer is placed in a briqueting press with a cooling conveyor, molded into pastilles and powdered with 0.2 mass % of talc.

Production of the Comb Polymer from c) and d)

An ethylene-vinylacetate copolymer wax c) grafted with maleic anhydride (vinylacetate content 32 mass %, maleic anhydride content 3.2 mass %, molecular mass weight average 3500 g/mol) is dosed at 4.2 kg/h via a belt weigher continuous scale into the feed screw of a Werner&Pfleiderer ZSK 30 twin-screw extruder, L/D ratio 48, with side stream dosing unit for liquid media and two vacuum degassing zones, and dissolved by heat at 75° C. An ester of glycerine and an acid mixture of erucic acid/oleic acid/linolic acid/ linolenic acid d) (molar ratio 6:1:1:1) are added to the melt from a storage tank heated at 100° C. via the side stream dosing unit at 1.2 kg/h, the melt is reacted in the first reaction zone (dwell time 4.5 min) at 115° C., degassed, reacted in the second reaction zone at 130° C. (dwell time 3.5 min), degassed, delivered at 100° C. into a self-cleaning melt filter using a melt gear pump (extrex SP, Maag pump systems) and molded into pastilles in a briquetting press with cooling conveyor.

The resulting comb polymer has an acid number of 69 and a melting range from 72 to 81° C.

5.1.3 Other Additive Components
Styrene-maleic anhydride copolymer, partially imidated with $C_{16}$-$C_{18}$-fatty amine, molecular mass number average 11500 g/mol, acid number 35
Ethylacrylate-octadecylacrylate copolymer (molar ratio 1:2, molecular mass number average 13500)

5.2 Production of Solutions Containing the Additive Components in Mineral Oil Middle Distillates 25 kg of a 40% solution of the other additive component, styrene-maleic anhydride-copolymer, partially imidated with $C_{16}$-$C_{18}$-fatty amine, molecular mass number average 11500 g/mol, acid number 35 in $C_8$-$C_9$-diesel aromatic fraction, 50 kg of a 50% solution of the comb polymer based on c) and d) in an aromatic hydrocarbon mixture (Solvesso), and 15 kg of a 20% solution of yet another additive component, ethylacrylate-dodecylacrylate copolymer in toluene, are mixed in a stirred tank reactor for 90 minutes at 65° C., and the mixture is transferred into a storage tank.

5.3 Production of the Mineral Oil with Additives

The additive solution according to 5.2 is injected at 0.48 kg/min into a product stream of diesel without additives, batch 16080601, flowing at 800 kg/min, and the mixture is transferred into a storage tank.

Testing the mineral oil formulation for low-temperature resistance revealed a CFPP value of −15° C. The lubricity test shows a "wear scar diameter" of 405 μm.

If a mineral oil formulation that only contains the unmodified ethylene-vinylacetate copolymer wax as an additive is produced under the same conditions, the CFPP value is −3° C. and the "wear scar diameter" is 520 μm.

Example 6

6.1 Starting Materials
6.1.1 Diesel without Additives
Batch: 030210 DGO
Characterization:
Cloud point (CP): +7° C.;
Cold filter plugging point (CFPP): +2° C.
Lubricity test: 556 μm
Distillation Analysis:

| Distilled quantity (vol. %)/temperature (° C.) | | | | | | | | | | |
|---|---|---|---|---|---|---|---|---|---|---|
| IBP | 10% | 20% | 30% | 40% | 50% | 60% | 70% | 80% | 90% | FBP |
| 235 | 266 | 279 | 291 | 301 | 310 | 320 | 337 | 342 | 357 | 374 |

6.1.2 Additive: Mixture of Copolymer Wax and Comb Polymer Based on c) and d)

Mixture of 15 mass % of ethylene-vinylacetate copolymer wax (manufactured by LEUNA Polymer GmbH, vinylacetate content 32 mass %, molecular mass weight average 2300 g/mol) and 85 mass % of a comb polymer of an oxidized ethylene-vinylacetaLe copolymer wax c) (molecular mass weight average 950 g/mol, acid number 27 mg KOH/g) and an ester of glycerine and an erucic/oleic acid mixture d) (molar ratio 1:1, degree of esterification 82 mol %).

Production of the Comb Polymer Based on c) and d)

An oxidized ethylene-vinylacetate copolymer wax c) (molecular mass weight average 950 g/mol, acid number 27 mg KOH/g) is dosed at 3.0 kg/h via a belt weigher continuous scale into the feed screw of a Werner&Pfleiderer ZSK 30 twin-screw extruder, L/D ratio 48, with a side stream dosing unit for liquid media and two vacuum degassing zones, and dissolved by heat at 80° C. An ester of glycerine and an acid mixture of erucic acid and oleic acid d) (molar ratio 1:1, degree of esterification 82 mol %) are added to the melt via the side stream dosing unit at 2.4 kg/h, the melt is reacted in the first reaction zone (dwell time 4.5 min) at 115° C., degassed, reacted in the second reaction zone at 130° C. (dwell time 4.5 min), degassed, delivered at 100° C. into a self-cleaning melt filter using a melt gear pump (extrex SP, Maag pump systems) and molded into pastilles in a briquetting press with cooling conveyor.

The resulting comb polymer has an acid number of 7.5 and a melting range from 64 to 72° C.

6.1.3 Other Additive Components
Styrene-maleic anhydride copolymer, partially imidated with $C_{16}$-$C_{18}$-fatty amine, molecular mass number average 10500 g/mol, acid number 45
Ethylacrylate-butylacrylate copolymer (molar ratio 1:2, molecular mass number average 13500)

6.2 Production of Solutions Containing the Additive Components in Mineral Oil Middle Distillates 25 kg of a 40% solution of the other additive component, styrene-maleic anhydride-copolymer, partially imidated with $C_{16}$-$C_{18}$-fatty amine, in $C_8$-$C_9$-diesel aromatic fraction, 50 kg of a 60% solution of the mixture of the copolymer wax with the comb polymer based on c) and d) in $C_8$-$C_9$-diesel aromatic fraction, and 15 kg of a 20% solution of yet another additive component, ethylacrylate-butylacrylate copolymer in toluene are mixed in a stirred tank reactor for 90 minutes at 65° C., and the mixture is transferred into a storage tank.

6.3 Production of the Mineral Oil with Additives

The additive solution according to 6.2 is injected at 0.12 kg/min into a product stream of diesel without additives, batch 030210, flowing at 800 kg/min, and the mixture is transferred into a storage tank.

Testing the mineral oil formulation for low-temperature resistance revealed a CFPP value of −9° C. The lubricity test shows a "wear scar diameter" of 392 μm.

If a mineral oil formulation that only contains the copolymer wax as an additive is produced under the same conditions, the CFPP value is −5° C. and the "wear scar diameter" is 528 μm.

Example 7

7.1 Starting Materials
7.1.1 Heating oil without Additives
Batch: 030225 test HEL 1
Characterization:
Cloud point (CP): +1° C.;
Cold filter plugging point (CFPP): −1° C.

Distillation analysis:

| Distilled quantity (vol. %)/temperature (° C.) | | | | | | | | | | | |
|---|---|---|---|---|---|---|---|---|---|---|---|
| IBP | 10% | 20% | 30% | 40% | 50% | 60% | 70% | 80% | 90% | FBP |
| 165 | 196 | 213 | 230 | 249 | 269 | 290 | 310 | 327 | 344 | 363 |

7.1.2 Additive: Mixture of Copolymer Wax and Comb Polymer Based on c) and d)

Mixture of 25 mass % of ethylene-vinylacetate copolymer wax (manufactured by LEUNA Polymer GmbH, vinylacetate content 32 mass %, molecular mass weight average 2300 g/mol) and 75 mass % of a comb polymer of an ethylene-vinylacetate-butylacrylate-acrylic acid copolymer c) (molecular mass weight average 1500 g/mol, acid number 35) and glycerine dioleyl ester d).

Production of the Comb Polymer from c) and d)

An ethylene-vinylacetate-butylacrylate-acrylic copolymer c) (molecular mass weight average 1500 g/mol, acid number 35) is dosed at 4.5 kg/h via a belt weigher continuous scale into the feed screw of a Werner&Pfleiderer ZSK 30 twin-screw extruder, L/D ratio 48, with a side stream dosing unit for liquid media and two vacuum degassing zones, and dissolved by heat at 95° C. Glycerine dioleyl ester d) is added to the melt from a storage tank heated to 100° C. via the side stream dosing unit at 1.6 kg/h, the melt is reacted in the first reaction zone (dwell time 4.5 min) at 105° C., degassed, reacted in the second reaction zone at 130° C. (dwell time 4.0 min), degassed, delivered at 100° C. into a self-cleaning melt filter using a melt gear pump (extrex SP, Maag pump systems) and molded into pastilles in a briqueting press with cooling conveyor.

The resulting comb polymer has an acid number of 4.5 and a melting range from 57 to 65° C.

7.1.3 Other Additive Components

Octadecene-maleic anhydride copolymer, partially imidated with $C_{16}$-$C_{18}$-fatty amine, molecular mass number average 3700 g/mol, acid number 22

Polyethyleneglycol, molar weight 650

7.2 Production of Solutions Containing the Additive Components in Mineral Oil Middle Distillates 25 kg of a 40% solution of another additive component, octadecene-maleic anhydride copolymer in $C_8$-$C_9$-diesel aromatic fraction, 50 kg of a 60% solution of the comb polymer based on c) and d) in $C_8$-$C_9$-diesel aromatic fraction, and 3 kg of yet another additive component, polyethyleneglycol, are introduced into a stirred tank reactor, stirred for 90 minutes at 65° C., and the mixture is transferred into a storage tank.

7.3 Production of the Mineral Oil with Additives

The additive solution according to 7.2 is injected at 0.24 kg/min into a product stream of heating oil without additives, batch 030225, flowing at 800 kg/min, and the mixture is transferred into a storage tank.

Testing the mineral oil formulation for low-temperature resistance revealed a CFPP value of −15° C.

If a mineral oil formulation containing only the copolymer wax as an additive is produced under the same conditions, the CFPP value is −12° C.

Example 8

8.1 Starting Materials
8.1.1 Heating Oil without Additives
Batch: 030218 test HEL 2
Characterization:
Cloud point (CP): +2° C.;
Cold filter plugging point (CFPP): −1° C.
Distillation Analysis:

| Distilled quantity (vol. %)/temperature (° C.) | | | | | | | | | | | |
|---|---|---|---|---|---|---|---|---|---|---|---|
| IBP | 10% | 20% | 30% | 40% | 50% | 60% | 70% | 80% | 90% | FBP |
| 173 | 194 | 207 | 225 | 247 | 273 | 299 | 320 | 337 | 355 | 379 |

8.1.2 Additive: Mixture of the Comb Polymer Based on c8) and d8) with Copolymer Wax Mixture of 25 mass % of ethylene-vinylacetate copolymer wax (manufactured by LEUNA Polymer GmbH, vinylacetate content 32 mass %, molecular mass weight average 2300 g/mol) and 75 mass % of a comb polymer of an ethylene-vinylacetate copolymer wax c) grafted with methacrylic acid (vinylacetate content 28 mass %, methacrylic acid content 4.5 mass %, molecular mass weight average 3200 g/mol) and glycerindierucic ester d).

Production of the Copolymer Wax c) Grafted with Methacrylic Acid:

Ethylene-vinylacetate copolymer wax (manufactured by LEUNA Polymer GmbH, vinylacetate content 32 mass %, molecular mass weight average 2300 g/mol), powdered with 0.2 mass % talc, is grafted with methacrylic acid according to DD 282 462 B5 at 80° C. in an extruder by dosing in a solution containing 0.5 mass % azoisobutyric dinitrile and 50 mass % of methacrylic acid in acetone, and the melt of the grafted copolymer is placed in a briqueting press with a cooling conveyor, molded into pastilles and powdered with 0.2 mass % of talc.

Production of the Comb Polymer from c) and d)

An ethylene-vinylacetate copolymer wax c) grafted with methacrylic acid (vinylacetate content 28 mass %, methacrylic acid content 4.5 mass %, molecular mass weight average 3200 g/mol) is dosed at 3.5 kg/h via a belt weigher continuous scale into the feed screw of a Werner&Pfleiderer ZSK 30 twin-screw extruder, L/D ratio 48, with side stream dosing unit for liquid media and two vacuum degassing zones, and dissolved by heat at 95° C. Glycerine dierucic ester d) from a storage tank heated at 100° C. is added to the melt via the side stream dosing unit at 1.45 kg/h, reacted in the first reaction zone (dwell time 4.5 min) at 125° C., degassed, reacted in the second reaction zone at 135° C. (dwell time 3.5 min), degassed, delivered at 100° C. into a self-cleaning melt filter using a melt gear pump (extrex SP, Maag pump systems) and molded into pastilles in a briqueting press with cooling conveyor.

The resulting comb polymer has an acid number of 4.5 and a melting range from 55 to 63° C.

8.1.3 Other Additive Components

Friedel-Krafts condensate of chlorinated polyethylene wax with naphthaline, molecular mass weight average 850

8.2 Production of Solutions Containing the Additive Components in Mineral Oil Middle Distillates 1.2 kg of a 10% solution of the other additive component, Friedel-Krafts condensate of chlorinated polyethylene wax with naphthaline in $C_8$-$C_9$-diesel aromatic fraction, are introduced into a stirred tank reactor that contains 2 kg of a 60% solution of the comb polymer based on c) and d) in $C_8$-$C_9$-diesel aromatic fraction at 65° C., the mixture is stirred for 120 minutes and transferred into a storage tank.

8.3 Production of the Mineral Oil with Additives

The additive solution according to 8.2 is injected at 0.28 kg/min into a product stream of heating oil without additives, batch 030218, flowing at 800 kg/min, and the mixture is transferred into a storage tank.

Testing the mineral oil formulation for low-temperature resistance revealed a CFPP value of −15° C.

If a mineral oil formulation containing only the unmodified ethylene-vinylacetate copolymer wax (CW3) as an additive is produced under the same conditions, the CFPP value is −1° C.

The invention claimed is:

1. An additive as component of mineral oil compositions with trace portions of additives wherein the additive is a comb polymer containing ester linkages and consisting of either:
   1) two segments (a) and (b), wherein segments (a) and (b) are covalently bonded to each other and wherein segment (a) is based on
      ethylene-vinylester copolymers modified by hydroxy groups or glycidyl groups with molecular mass weight averages from 3000 to 50000 and an ethylene portion of 50 to 90 mass %,
      and wherein segment (b) is based on
      partially imidated and/or partially esterified maleic anhydride copolymers, wherein segment (a) is connected by means of ester linkages to segment (b), or
   2) two segments (c) and (d), wherein segments (c) and (d) are covalently bonded to each other and wherein segment (c) is based on
      ethylene-vinylester copolymers modified by acid and/or acid anhydride groups with molecular mass weight averages from 3000 to 50000 and an ethylene portion of 50 to 90 mass %,
      and wherein segment (d) is based on
      polyalcohols partially esterified with $C_{12}$-$C_{40}$-monocarboxylic acids wherein segment (c) is connected by means of ester linkages to segment (d),
and whereby the content of the comb polymer in the mineral oil is 0.005 to 1 mass %, and the weight ratio of the segments comb polymer segment a/comb polymer segment b based on components a and b, or the segments comb polymer segment c/comb polymer segment d based on components c and d is 10:90 to 90:10, respectively.

2. The additive according to claim 1 wherein the ethylene-vinylester copolymers modified by hydroxy groups in the comb polymer based on a) and b) are oxidized ethylene-vinylacetate copolymers with molecular mass number averages of 800 to 5000 and OH numbers from 10 to 150 mg KOH/g, or partially saponified ethylene-vinylacetate copolymers with molecular mass number averages of 800 to 5000, in which 3 to 30 mol % of the vinylacetate units are saponified, or hemiacetals of ethylene-vinylester-vinylalcohol copolymers with butyraldehyde.

3. The additive according to claim 1 wherein the ethylene-vinylester copolymers modified by hydroxy groups or glycidyl groups in the comb polymer based on a) and b) contain 3 to 20 mass % of polar unsaturated monomers of the hydroxy-$C_2$-$C_{24}$-alkyl(meth)acryl ester or glycidyl (meth)acrylic ester type as comonomer component in the ethylene-vinylester copolymer or grafted onto the ethylene-vinylester copolymer.

4. The additive according to claim 1 wherein the partially imidated maleic anhydride copolymers contained in the comb polymer based on a) and b) and connected by means of ester linkages are maleic anhydride-a-methylstyrene copolymers partially imidated with $C_6$-$C_{24}$-monoalkylamines in which the molar ratio of anhydride groups in the copolymer to bound $C_6$-$C_{24}$-monoalkylamine in the copolymer is 4:1 to 1.1:1.

5. The additive according to claim 1 wherein in the comb polymer based on c) and d) the ethylene-vinylester copolymers modified by acid groups are oxidized ethylene-vinylacetate copolymers with molecular mass number averages from 800 to 5000 and acid numbers from 5 to 40 mg KOH/g.

6. The additive according to claim 1 wherein in the comb polymer based on c) and d) the ethylene-vinylester copolymers modified by acid and/or acid anhydride groups are copolymers of ethylene, vinyl esters and 1 to 20 mass % of unsaturated carboxylic acids and/or carboxylic anhydrides, preferably acrylic acid, methacrylic acid and/or maleic anhydride, or are ethylene-vinylester copolymers grafted with 1 to 20 mass % of unsaturated carboxylic acids and/or carboxylic anhydrides, preferably acrylic acid, methacrylicacid and/or maleic anhydride.

7. The additive according to claim 1 wherein in the comb polymer based on c) and d) the polyalcohols partially esterified with $C_{12}$-$C_{40}$-monocarboxylic acids are glycerine esters of unsaturated $C_{16}$-$C_{24}$-monocarboxylic acids, and wherein the portion of $C_{22}$-monocarboxylic acid in relation to the total weight of the $C_{16}$-$C_{24}$-monocarboxylic acids is 45 to 52 mass %.

8. The mineral oil compositions according to claim 1 wherein the mineral oils are crude oils or fuel oils from a middle distillate with a sulfur content under 0.05 percent by weight.

9. The mineral oil compositions according to claim 1 wherein the mineral oil compositions contain a total from 0 up to 200 mass percent in relation to the comb polymer of other additive components such as fatty acid mixtures, polar nitrogen compounds, preferably polyamines, etheramines, amino alcohols, amine salts, amides or imides of multivalent carboxylic acids; modified copolymers of ethylenically unsaturated $C_4$-$C_{20}$-dicarboxylic anhydrides, unmodified ethylene-vinylester copolymers, $C_7$-$C_{30}$-alcohols, polyalkylene glycols, esters or ethers of polyoxyalkylene compounds, $C_2$-$C_6$-oxyalkyl-bridged $C_{12}$-$C_{40}$-monocarboxylic acids, preferably $C_3$-$C_4$-oxyalkyl-bridged unsaturated $C_{16}$-$C_{24}$-monocarboxylic acids with a content of $C_{22}$-monocarboxylic acids in relation to the overall weight of the $C_{16}$-$C_{24}$-monocarboxylic acids of 45 to 52 mass %, hydrocarbon polymers, alkylphenol-aldehyde copolymers, aromatic compounds with $C_8$-$C_{100}$-alkyl substituents, carboxylated polyamines, detergents, corrosion inhibitors, demulsifiers, metal deactivators, cetane number improvers, defoaming agents and/or cosolvents.

10. A method for producing mineral oil compositions with trace portions of additives wherein the mineral oil compositions that contain as additive a comb polymer containing ester linkages and consisting of either:

1) two segments (a) and (b), wherein segments (a) and (b) are covalently bonded to each other and wherein segment (a) is based on ethylene-vinylester copolymers modified by hydroxy groups or glycidyl groups with molecular mass weight averages from 3000 to 50000 and an ethylene portion of 50 to 90 mass %, and wherein segment (b) is based on partially imidated and/or partially esterified maleic anhydride copolymers, wherein segment (a) is connected by means of ester linkages to segment (b), or 2) two segments (c) and (d), wherein segments (c) and (d) are covalently bonded to each other and wherein segment (c) is based on ethylene-vinylester copolymers modified by acid and/or acid anhydride groups with molecular mass weight averages from 3000 to 50000 and an ethylene portion of 50 to 90 mass %, and wherein segment (d) is based on polyalcohols partially esterified with $C_{12}$-$C_{40}$-monocarboxylic acids wherein segment (c) is connected by means of ester linkages to segment (d), and whereby the content of the comb polymer in the mineral oil is 0.005 to 1 mass %, and the weight ratio of the segments comb polymer segment a/comb polymer segment b based on components a and b, or the segments comb polymer segment c/comb polymer segment d based on components c and d is 10:90 to 90:10, respectively, are produced in a prehomogenization process in which
solutions containing 1 to 60 mass % of comb polymer in mineral oil middle distillates are produced at 20 to 90° C. in a first process step, and the solutions containing the comb polymer are homogenized with the mineral oil as the main component in a second process step, a total of 0 to 200 mass % in relation to the comb polymer of other additive components being added to the mineral oil in either the first or second process step.

11. A method of transporting the mineral oil compositions according to claim 1, comprising transporting said mineral oil compositions wherein said mineral oil compositions are flowable at low temperatures.

12. The additive according to claim 2 wherein the partially imidated maleic anhydride copolymers contained in the comb polymer based on a) and b) and connected by means of ester linkages are maleic anhydride-a-methylstyrene copolymers partially imidated with $C_6$-$C_{24}$-monoalkylamines in which the molar ratio of anhydride groups in the copolymer to bound $C_6$-$C_{24}$-monoalkylamine in the copolymer is 4:1 to 1.1:1.

13. The additive according to claim 3 wherein the partially imidated maleic anhydride copolymers contained in the comb polymer based on a) and b) and connected by means of ester linkages are maleic anhydride-a-methylstyrene copolymers partially imidated with $C_6$-$C_{24}$-monoalkylamines in which the molar ratio of anhydride groups in the copolymer to bound $C_6$-$C_{24}$-monoalkylamine in the copolymer is 4:1 to 1.1:1.

14. The additive according to claim 5 wherein in the comb polymer based on c) and d) the polyalcohols partially esterified with $C_{12}$-$C_{40}$-monocarboxylic acids are glycerine esters of unsaturated $C_{16}$-$C_{24}$-monocarboxylic acids, and wherein the portion of $C_{22}$-monocarboxylic acid in relation to the total weight of the $C_{16}$-$C_{24}$-monocarboxylic acids is 45 to 52 mass %.

15. The additive according to claim 6 wherein in the comb polymer based on c) and d) the polyalcohols partially esterified with $C_{12}$-$C_{40}$-monocarboxylic acids are glycerine esters of unsaturated $C_{16}$-$C_{24}$-monocarboxylic acids, and wherein the portion of $C_{22}$-monocarboxylic acid in relation to the total weight of the $C_{16}$-$C_{24}$-monocarboxylic acids is 45 to 52 mass %.

16. The mineral oil compositions according to claim 2 wherein the mineral oils are crude oils or fuel oils from a middle distillate with a sulfur content under 0.05 percent by weight.

17. The mineral oil compositions according to claim 3 wherein the mineral oils are crude oils or fuel oils from a middle distillate with a sulfur content under 0.05 percent by weight.

18. The mineral oil compositions according to claim 4 wherein the mineral oils are crude oils or fuel oils from a middle distillate with a sulfur content under 0.05 percent by weight.

19. The mineral oil compositions according to claim 5 wherein the mineral oils are crude oils or fuel oils from a middle distillate with a sulfur content under 0.05 percent by weight.

20. The mineral oil compositions according to claim 6 wherein the mineral oils are crude oils or fuel oils from a middle distillate with a sulfur content under 0.05 percent by weight.

21. The mineral oil compositions according to claim 7 wherein the mineral oils are crude oils or fuel oils from a middle distillate with a sulfur content under 0.05 percent by weight.

22. A method of using the mineral oil compositions according to claim 1 as fuels, comprising using said mineral oil compositions as fuels wherein said mineral oil compositions have high lubricity and flowability.

23. The compositions according to any of claim 8 or 16-21 wherein the mineral oils are selected from the group consisting of heating oils, gas oils, and diesel oils.

* * * * *